M. C. OVERMAN.
MOLD FOR TIRES.
APPLICATION FILED MAY 11, 1912.

1,223,726.

Patented Apr. 24, 1917.
3 SHEETS—SHEET 1.

WITNESSES:
Edna W. Moreland
A. C. McDonnell

INVENTOR
Max Cyrus Overman
BY
E. W. Scherr Jr.
ATTORNEY

M. C. OVERMAN.
MOLD FOR TIRES.
APPLICATION FILED MAY 11, 1912.

1,223,726.

Patented Apr. 24, 1917.
3 SHEETS—SHEET 3.

WITNESSES:
Edna A. Wieland
A. C. McDonnell

INVENTOR
Max Cyrus Overman
BY
E. W. Scherr Jr.
ATTORNEY

UNITED STATES PATENT OFFICE.

MAX CYRUS OVERMAN, OF NEW YORK, N. Y.

MOLD FOR TIRES.

1,223,726.  Specification of Letters Patent.   Patented Apr. 24, 1917.

Application filed May 11, 1912. Serial No. 696,638.

*To all whom it may concern:*

Be it known that I, MAX CYRUS OVERMAN, a citizen of the United States, residing at 250 West Fifty-fourth street, New York city, in the county of New York and State of New York, have invented certain new and useful Improvements in Molds for Tires, of which the following is a specification.

My present invention relates to an improved mold for making automobile and other vehicle tires, the features of which will be apparent to those skilled in the art from an understanding of the following description, in connection with the drawings which show one form of mold within my invention.

Figure 1:
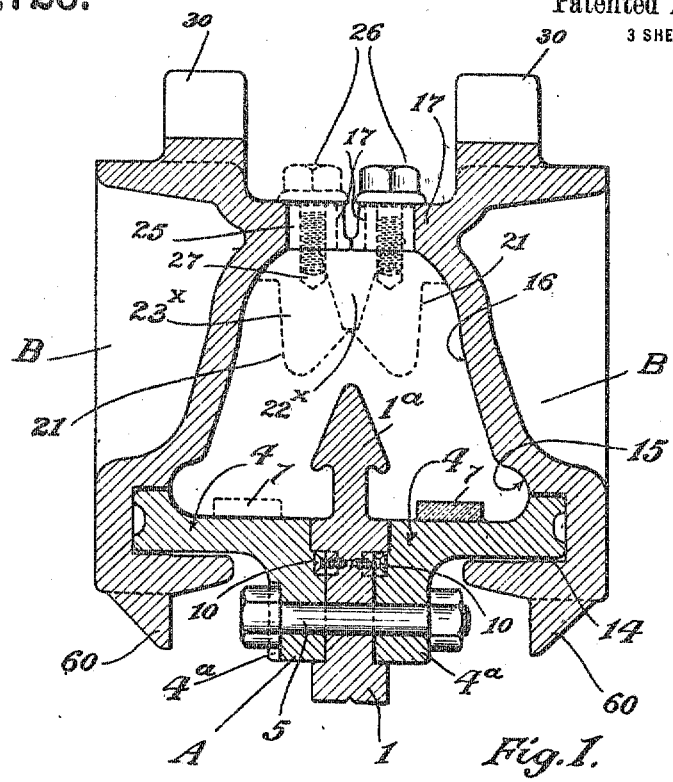
Figure 2:
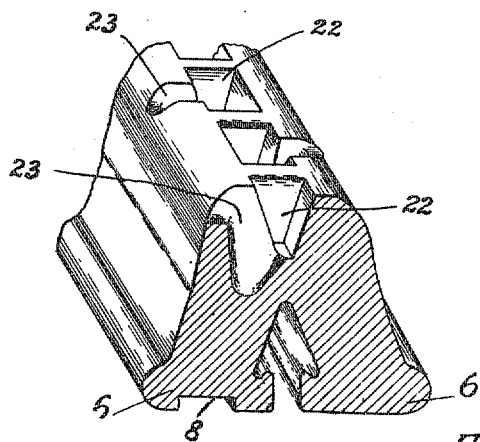
Figure 3:
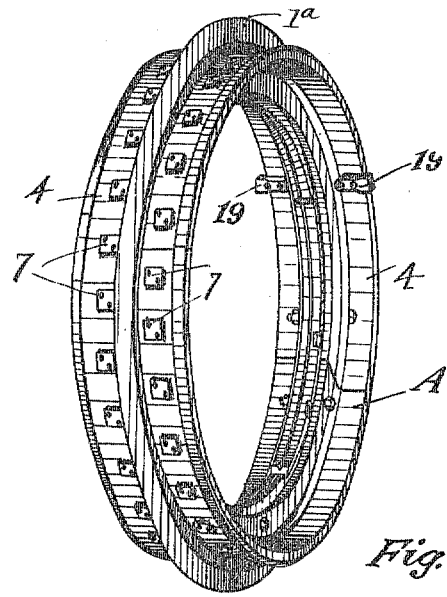
Figure 4:
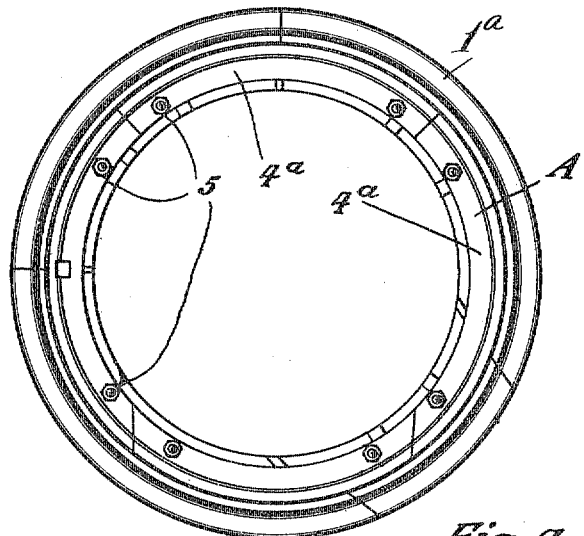
Figure 6:
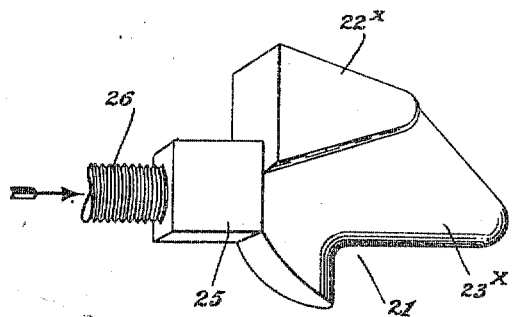
Figure 7:
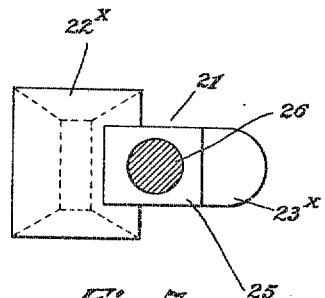
Figure 5:
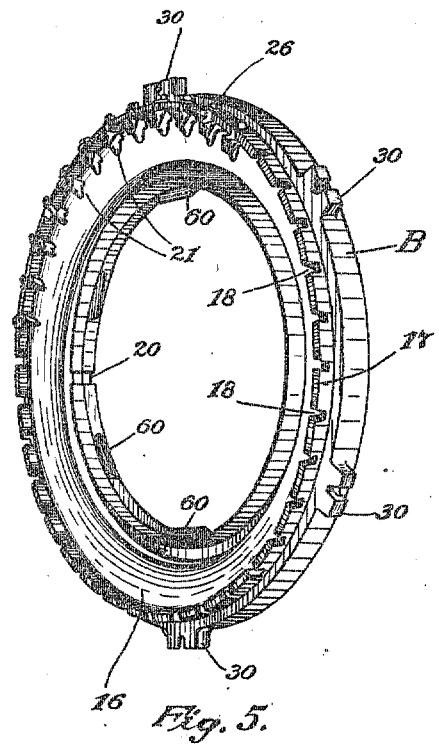

In them Figure 1 is a radial section through a portion of the mold showing the various rings or parts in their closed position. Fig. 2 is a perspective of a fragment of a tire made by the mold of my present invention. Fig. 3 is a perspective view of the base-ring of the mold; and Fig. 4 is a side elevation thereof. Fig. 5 is an inside perspective view of one of the side-rings of the mold. Fig. 6 is a perspective view of one of the inserts; and Fig. 7 is a view of said insert looking in the direction of the arrow in Fig. 6.

I will now describe the specific devices of the drawings. The mold is made of three principal parts, consisting of a base-ring A and two side-rings B. The base-ring is shown in perspective in Fig. 3, and in side elevation or plan in Fig. 4; and one of the side-rings B is shown in perspective in Fig. 5.

The base-ring A is made up of a substantially flat ring 1 having an outer periphery 1ª which in section has the shape of an arrowhead. This is the core corresponding to the longitudinal V-shaped opening 3 through the tire. 4—4 are hoop-like rings having inwardly extending flanges 4ª by which they are secured to both sides of the flat ring 1 by bolts 5. The outer periphery of these hoops 4 corresponds, as will be seen from Fig. 1, with the base of the tire and partly with its sides to the extent of one-half of the thickness of the beads 6 at the basal corners of the tire.

7—7 are a plurality of blocks mounted on the outer periphery of each hoop 4 in spaced apart relation, as best shown in Fig. 3, and being relatively staggered on the two hoops. These are the cores corresponding to the sockets 8 in the base of the tire for the reception of the driving blocks on the felly of the vehicle wheel, as set forth in my copending U. S. application, Serial No. 649,952.

The hoops 4 are made in sections held together by the flat ring 1, to which they are bolted by the aforesaid bolts 5. Similarly the flat ring 1 is made in sections staggered relative to those of the hoops so that they all hold together when bolted. The sectional construction, of course, permits the molded tire to be separated from the base of the mold.

10—10, in Fig. 1, shows some of the blocks or keys which are mounted on one of the parts to enter sockets in the other part, when said parts have been properly assembled to complete the base-ring A of the mold.

Each side-ring B has an annular groove 14. Fig. 1, in its inner face which receives into it the outer edge of one of the hoops 4. Said inner face at 15 then completes the other half of the beads 6 of the tire, and then at 16 converges to form the side of the tire. Finally each side-ring B has an annular flange 17 that extends inwardly half way across the tread of the tire. These tread flanges 17 are formed with numerous slots 18 (Fig. 5), which are relatively staggered on the two flanges when the parts of the mold are properly assembled. For determining the proper assembling of the mold, the base-ring A has lugs 19 and the side-rings B have each a slot 20 receiving into it one of said lugs, as said rings B are brought together against the base-ring A into the final closed condition of the mold shown in Fig. 1.

21—21 are a large number of inserts each having the shape shown in the detailed views (Figs. 6 and 7) and each being a core corresponding with one of the longitudinal thread openings 22 in the tire and its connected transverse opening 23. Thus the part 22ˣ of the insert fits the opening 22 in the tire; and the part 23ˣ of the insert fits the opening 23 in the tire.

25 is a rectangular head on each insert receivable into one of the slots 18 of the side frames B.

26 is a bolt, one for each insert, engaging a threaded socket 27 (Fig. 1) in the head of the insert. The heads of these bolts overhang the sides of the slots 18 in the flanges 17, as do also the portion 22ˣ of the inserts on the opposite face of the flanges with the result that when the bolts 26 are tightened they clamp or hold the inserts rigidly in place as shown in Figs. 1 and 5.

To use the mold, the side-rings B are fully equipped all around with the inserts 21, as aforesaid. Then a suitable mass of rubber material is applied and distributed around the outside of the base-ring A of Fig. 3, and the V-shaped ring 1°. Then the side-rings B are properly alined relative to the base-ring A and are gradually pressed together hydraulically or otherwise in the direction of closing the mold as in Fig. 1. In so doing the inserts 21 cut through the sides of the rubber mass, but the spaces behind and all around them are soon filled by the excess rubber which naturally squeezes toward the tread flanges 17, between whose edges the excess finds its way out and is finally cut off by the meeting of said edges when the mold is fully closed.

Then the tire is vulcanized in the mold. When this and the other usual operations are completed, the insert-bolts 26 are loosened and the side-rings are drawn apart. This leaves the individual inserts sticking into the tread of the tire whence they are readily pulled out radially. Finally the sections of the base-ring A are unbolted to free the tire completely from the mold.

Some of the advantages of the mold are: (1) It has only three main sections. (2) The overflow is at the top or outer periphery of the mold so that the excess material must fill all the spaces in the mold including those at the top before it can escape. (3) The construction permits the inserts to be readily removed from the molded tire. Further they come away completely from the mold and therefore are readily kept clean and smooth. (4) For the same reason, the same mold can be used with various shapes and depths of insert to given tires with varying tread construction.

60 are lugs on the side rings which project in position to be struck or pried against to assist in opening the mold.

The notched lugs 30 on the side-rings serve to be connected by bolts to hold the parts of the mold together during transportation, etc.

What I claim is:

1. A tire mold comprising a base-ring having an outer periphery corresponding with the base of the tire and having a core corresponding with the longitudinal opening through the tire; side-rings which are laterally removable and replaceable relative to the base-ring, said side-rings each having an inner face corresponding with one side of the tire and further having an inwardly directed annular flange, whose inner periphery corresponds with half the tread of the tire, said side-rings having a sliding fit with the base-ring so that the excess material squeezes out between the aforesaid tread flanges, said flanges being inwardly slotted from their free edges; insert-cores having flat-sided heads receivable into said slots, and bolts having heads which overlie the sides of said slots and being screw-connected with the heads of the inserts, which latter also overlie the sides of said slots on the opposite face of the flanges.

2. A mold in separable parts for forming tires having depressed surface openings, said parts having coacting flanges which abut when the mold parts are together to form the tread of the tire, inserts for forming said depressed openings carried by the tread-forming flanges within the mold space so that they are forced laterally through the tire-forming material as the flanges are brought together, and means operable from the outside of the mold for detaching the inserts from the flanges to have them in the tire as the flanged mold parts are separated.

3. A mold in separable parts for forming tires having depressed surface openings, said parts having coacting flanges which abut when the mold parts are together to form the tread of the tire, inserts for forming said depressed openings carried by the tread-forming flanges within the mold space so that they are forced laterally through the tire-forming material as the flanges are brought together, and means operable from the outside of the mold for detaching the inserts from the flanges to leave them in the tire as the flanged mold parts are separated, said means comprising screw connections to the inserts located in transverse slots formed in the edge of the given tread-forming flange.

In testimony whereof I affix my signature in presence of two witnesses.

MAX CYRUS OVERMAN.

Witnesses:
E. W. SCHERR, Jr.,
A. C. McDONNELL.